J. H. SNUDDEN.
WIND SHIELD CLEANER.
APPLICATION FILED DEC. 15, 1916.
1,249,683.
Patented Dec. 11, 1917.
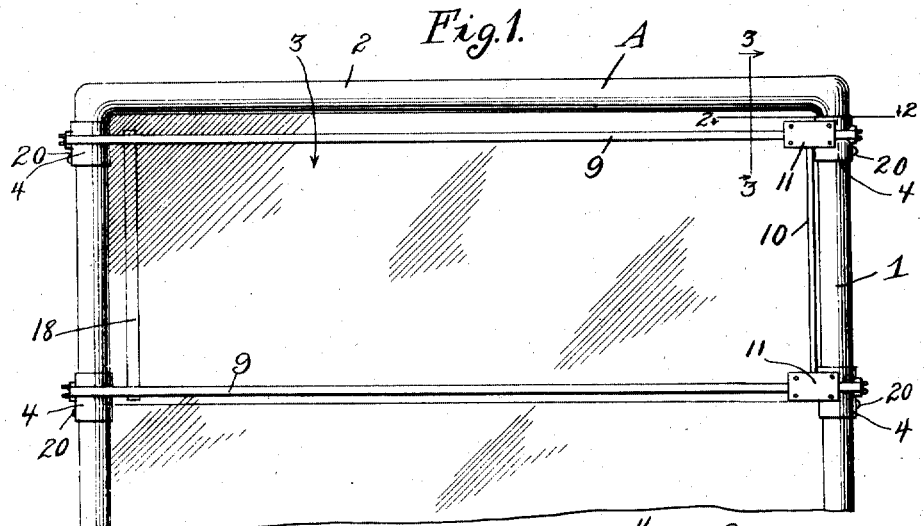
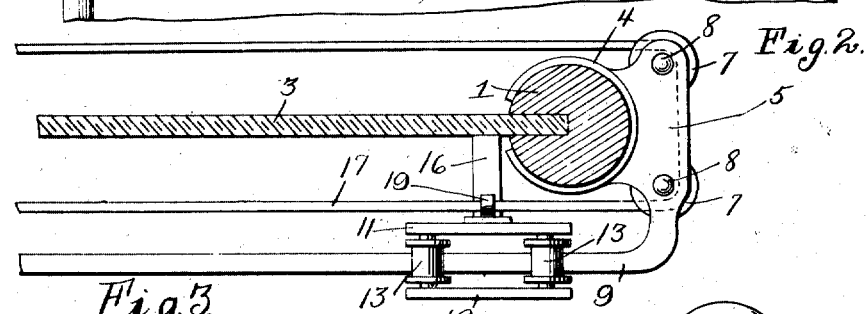
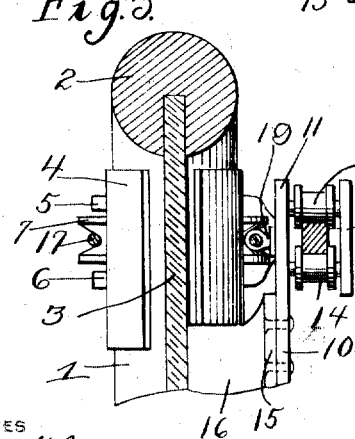
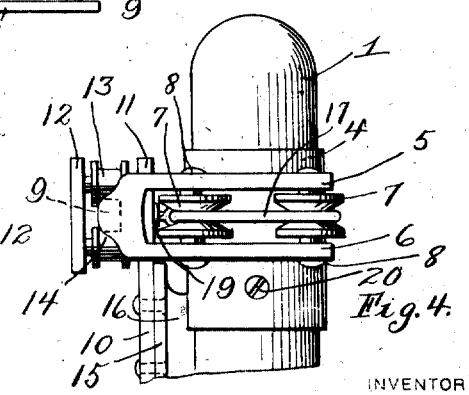
INVENTOR
James H. Snudden
WITNESSES
Arthur K. Moore
Wm. K. Mulligan
BY Richard B. Owen,
ATTORNEY

UNITED STATES PATENT OFFICE.

JAMES H. SNUDDEN, OF BOTHELL, WASHINGTON.

WIND-SHIELD CLEANER.

1,249,683.    Specification of Letters Patent.    Patented Dec. 11, 1917.

Application filed December 15, 1916. Serial No. 137,186.

*To all whom it may concern:*

Be it known that I, JAMES H. SNUDDEN, a citizen of the United States, residing at Bothell, in the county of King and State of Washington, have invented certain new and useful Improvements in Wind-Shield Cleaners, of which the following is a specification.

This invention relates to a wind shield cleaner and the primary object of the invention is to provide a cleaning element adapted to engage a portion of the surface of the glass in a wind shield and provided with means for causing the cleaning element to travel across the surface of the glass for removing snow, sleet, dust or other matter likely to obstruct the attention of the operator.

As another object of the invention, the cleaning element is mounted on an operating mechanism for drawing the cleaning element across the glass on the front surface of the glass, the operating mechanism including a handle arranged on the rear side of the wind shield whereby the operator may conveniently grasp the same for causing the glass cleaner to move completely across one surface of the glass.

As a further object of the invention the device includes clamps adapted to embrace the side frame bars of the wind shield, the sliding engagement of the clamps with the said bars permitting the whole device to be easily and quickly removed from or attached to the wind shield.

A further object of this invention is the provision of a wind shield cleaner which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a front elevation of a wind shield showing my invention applied thereto.

Fig. 2 is a horizontal fragmentary section on the line 2—2 of Fig. 1.

Fig. 3 is a section on the line 3—3 of Fig. 1.

Fig. 4 is a fragmentary end elevation of the device.

Referring to the drawing, wherein is illustrated the preferred form of my invention, and in which like numerals of reference indicate corresponding parts throughout the several views, the wind shield A includes the usual upright frame bars 1 and the top frame bar 2 which are usually round in cross-section and provided with grooves for receiving the edges of the glass panel 3. This panel is the one through which the operator watches the roadway while driving the vehicle and, of course, the same must be kept free from any foreign element or matter that would be likely to obscure the vision of the operator.

Embracing the upper portion of each of the side bars 1 is a clamp 4 which consists of a substantially cylindrical tube preferably formed from spring metal and which is partially opened whereby the clamp may be slipped on the arm 1 when applying the same to the frame of the wind shield. Integrally formed with the tubular portion of the sleeve is an upper flange 5 and a lower flange 6, the same being arranged in spaced relation and disposed in a horizontal plane. Each flange 5 and 6, of each clamp 4 extends from the outer edge of the frame for permitting the reception of pulleys 7 between the flanges. A pair of these pulleys 7 is carried by each pair of flanges, the pintles 8 for the pulleys having their ends fixed in the said flanges. As clearly shown by Figs. 2 and 4 of the drawing, each pair of flanges is connected to a track-rail 9, the ends of which are enlarged and integrally connected to the flanges of each clamp.

The above description has had reference to the upper portion of the device but, by referring to Fig. 1 of the drawing, it will be observed that the lower portion of the device is identical in construction and is mounted adjacent the lower edge of the panel 3.

A supporting plate 10 has its upper and lower ends enlarged to provide bearing plates 11 of substantially rectangular formation. Arranged in spaced relation to the plates 11 are the retaining plates 12 while arranged between the plates 11 and 12 are the upper rollers 13 and the lower rollers 14. The rollers are provided with trunnions extending through the apertures in the plates 11 and 12 and, since the plates are arranged upon opposite sides of the track-rail, the rollers will be disposed in a position whereby they will travel along the track-rail 9. The upper pair of rollers 13 are adapted to travel on the upper surface of the track-rail 9 while the lower pair of rollers 14 are adapted to travel on the lower surface of the track-rail 9. Each roller has an annular flange for engaging the sides of the track-rail. This construction provides a truck for each track-rail, each truck comprising four rollers.

A vertical plate 10 has attached thereto a plate 15 which carries the scraper or cleaning element 16 and which projects toward and contacts with the front surface of the glass panel 3. This cleaning element 16 is constructed from rubber or other suitable material and its edge contacts with the glass panel so that when the trucks are moved along the track-rails 9 the glass will be rubbed or scraped free from any foreign matter that may have adhered to the surface of the glass. The length of the scraper element 16 is sufficient to clean a comparatively large surface of the glass and especially that portion of the glass through which the operator of the vehicle views the roadway in front of the vehicle.

For causing the trucks to travel along the track-rails 9, I have provided a flexible cable or wire strand 17 which passes around the pulleys 7 carried by the flanges 8. A wire 17 is provided for both the upper and the lower portions of the device and an operating handle 18 has its ends connected to the wire at a point most convenient for the operator to reach. As shown by Fig. 1 of the drawing, the operating handle 18 is disposed on the rear side of the wind shield adjacent one edge thereof. The operating handle is in this position when the scraper 16 is at the opposite edge of the wind shield on the front side thereof. To move the scraper across the front surface of the glass it is merely necessary for the operator to grasp the handle and push the same to the opposite edge of the wind shield, and the movement thus imparted to the wire or flexible cable 17 will cause the trucks to travel over the track-rail 9 to the opposite end thereof thus moving the scraper completely across the surface of the glass. In this connection, it is pointed out, that the flexible cables are connected to the eyelets 19 carried by the plates 11. When the clamps 4 are mounted in place, a set screw 20 is passed through a screw threaded opening in the lower portion of the clamp and has its end engaged with the side bars 1 of the wind shield frame thereby holding the clamp in fixed position.

From the foregoing it will be observed that a very simple and durable wind shield cleaner has been provided, the details of which embody the preferred form. I desire it to be understood however, that slight changes in the minor details of construction may be made without departing from the spirit of the invention or the scope of the claims hereunto appended.

I claim:

1. A wind shield cleaning device comprising, clamps adapted to be supported by the wind shield frame, track-rails supported by the said clamps adjacent the upper and lower edges of the glass panel of the wind shield, trucks mounted upon and adapted to travel along said track-rails, a cleaning element carried by the said trucks, the said trucks including a plurality of rollers having engagement with the upper and lower surfaces of each track-rail.

2. A wind shield cleaning device comprising, clamps adapted to be supported by the wind shield frame, track-rails supported by the clamps adjacent the upper and lower edges of the glass panel of the wind shield, trucks mounted upon and adapted to travel along the said track-rails, a cleaning element carried by said trucks, the said trucks including a plurality of rollers having engagement with the upper and lower surfaces of each track-rail, and a flexible cable arranged at the upper and lower edges of the panel and extending entirely around the frame and connected to said trucks.

In testimony whereof I affix my signature in presence of two witnesses.

JAMES H. SNUDDEN.

Witnesses:
 Geo. T. Ericksen,
 Harry L. Reder.